(12) United States Patent
Lin et al.

(10) Patent No.: US 6,862,111 B2
(45) Date of Patent: Mar. 1, 2005

(54) METHOD AND APPARATUS FOR QUANTIZING A COLOR IMAGE THROUGH A SINGLE DITHER MATRIX

(75) Inventors: Frederick Lin, Fremont, CA (US); Shultz Chan, Albany, CA (US)

(73) Assignee: PictoLogic, Inc., Fremont, CA (US)

( * ) Notice: Subject to any disclaimer, the term of this patent is extended or adjusted under 35 U.S.C. 154(b) by 928 days.

(21) Appl. No.: 09/775,003

(22) Filed: Jan. 31, 2001

(65) Prior Publication Data

US 2002/0008885 A1 Jan. 24, 2002

Related U.S. Application Data

(60) Provisional application No. 60/179,586, filed on Feb. 1, 2000.

(51) Int. Cl.[7] .............................. H04N 1/52; H04N 1/60
(52) U.S. Cl. ........................ 358/1.9; 358/518; 358/530; 358/534; 358/3.19; 345/597; 345/604
(58) Field of Search .......................... 358/1.9, 534–536, 358/518, 530, 3.19; 345/597, 604

(56) References Cited

U.S. PATENT DOCUMENTS

| | | | |
|---|---|---|---|
| 5,377,041 A | 12/1994 | Spaulding et al. | 358/518 |
| 5,497,180 A | 3/1996 | Kawakami et al. | 347/131 |
| 5,959,631 A | 9/1999 | Knittel | 345/420 |

*Primary Examiner*—Scott A. Rogers
(74) *Attorney, Agent, or Firm*—Heller Ehrman White & McAuliffe LLP

(57) ABSTRACT

This invention relates to a color image dithering method and apparatus for producing an output point in an output color space corresponding to a selected vertex in a tetrahedron of a three-dimensional cubic subinterval of a pixel point in a source color space. The device includes a truncating logic for truncating a value of a pixel having a point in a color space of the source image, for locating a three-dimensional cubic subinterval containing the point; a random number generator for generating a random number as a threshold value for dithering each pixel value of the source image; a first comparator for locating a tetrahedron having four vertices in the three-dimensional cubic subinterval that contains the pixel point; a second logic for assigning a probability density corresponding to each of the vertex; a second comparator for selecting a vertex provided by the threshold value through an inverse probability distribution function derived from the probability densities of said vertices; and a third logic for locating an output point in an output color space corresponding to the selected vertex.

21 Claims, 17 Drawing Sheets

| tetrahedron forms | | | | | | |
|---|---|---|---|---|---|---|
| boundary conditions | a>=b>c | a>=c>b | c>=a>b | c>=b>a | b>=c>a | b>=a>c |
| $V_{000}$ | 1-a | 1-a | 1-c | 1-c | 1-b | 1-b |
| $V_{100}$ | a-b | a-c | | | | |
| $V_{010}$ | | | | | b-c | b-a |
| $V_{110}$ | b-c | | | | | a-c |
| $V_{001}$ | | | c-a | c-b | | |
| $V_{101}$ | | c-b | a-b | | | |
| $V_{011}$ | - | | | b-a | c-a | |
| $V_{111}$ | c | b | b | a | a | c |

| tetrahedron forms | | | | | | |
|---|---|---|---|---|---|---|
| boundary conditions | a+b+c<1 | a+c>=b+1 | b+c>=a+1 | a+b>=c+1 | otherwise | |
| $V_{000}$ | 1-a-b-c | | | | | |
| $V_{100}$ | a | 1-c | | 1-b | $\frac{(1+a-b-c)}{2}$ | |
| $V_{010}$ | b | | 1-c | 1-a | $\frac{(1+b-a-c)}{2}$ | |
| $V_{110}$ | | | | a+b-c-1 | | |
| $V_{001}$ | c | 1-a | 1-b | | $\frac{(1+c-a-b)}{2}$ | |
| $V_{101}$ | | a+c-b-1 | | | | |
| $V_{011}$ | | | b+c-a-1 | | | |
| $V_{111}$ | | b | a | c | $\frac{(a+b+c-1)}{2}$ | |

| tetrahedron forms | ◰ | ◰ | ◰ | ◰ | ◰ | ◰ |
|---|---|---|---|---|---|---|
| boundary conditions | a+b+c<1 | a+b+c>=1<br>a+b<1<br>a+c>=1 | a+c>=1<br>a+b<1 | a+b>=1<br>a+c<1 | a+b+c<2<br>a+b>=1<br>a+c>1 | a+b+c>=2 |
| $V_{000}$ | 1-a-b-c | | | | | |
| $V_{100}$ | a | a | 1-c | 1-b | 2-a-b-c | |
| $V_{010}$ | b | 1-a-c | | 1-a-c | | |
| $V_{110}$ | | | | a+b-1 | a+b-1 | 1-c |
| $V_{001}$ | c | 1-a-b | 1-a-b | | | |
| $V_{101}$ | | | a+c-1 | | a+c-1 | 1-b |
| $V_{011}$ | - | a+b+c-1 | b | c | 1-a | 1-a |
| $V_{111}$ | | | | | | a+b+c-2 |

METHOD AND APPARATUS FOR QUANTIZING A COLOR IMAGE THROUGH A SINGLE DITHER MATRIX

CROSS-REFERENCE TO RELATED APPLICATIONS

This application incorporates by reference to and priority claimed from U.S. Provisional Patent Application No. 60/179,586 entitled "Quantizing Color Image Through a Single Dither Matrix," filed Feb. 1, 2000.

BACKGROUND OF THE INVENTION

1. Field of Invention

This invention relates generally to imaging processing and more particularly to color image quantization technology.

2. Description of the Prior Art

The present invention concerns the technology of image output to a video display or to a printer. In most cases, a digitally stored color image is stored in terms of nominal values that a device outputting the image should attempt to approximate as closely to the original source as possible. The image may be stored as pixels wherein the pixels are typically presented in the form of a three-component vectors. Quantizing or dithering an image is a process of reducing bit-resolution of a source image. Image quantization or dithering can be done through either error-diffusion or dither matrix, which is also known as the threshold array method.

Conventionally, quantizing or dithering a red-green-blue (RGB) or cyan-magenta-yellow (CMY) color image is done by quantizing each colorant separately through multiple independent dither matrices. The method is simple to implement, but at a cost of local color variation and the complexity of providing multiple independent dither matrixes.

Referring to FIG. 1, which illustrates a prior art schematic view of a source color space 10 of a color image. The color space 10 is presented as a three-dimensional vector space defined by three axes A 12, B 14 and C 16 which correspond to colorants R, G, B or C, M, Y respectively depending on the output device. A pixel value is a three-component vector having a point in the color space. A color image is a two-dimensional array of pixel values. A source image contains a source color image. An output image for display or printout contains an output color image. Each pixel in the source image is referred to by Pixel[i,j], wherein i and j are indices into the pixel array. The pixel values of colorants in the source image are referred to as $A_s[i,j]$ 18, $B_s[i,j]$ 20, $C_s[i,j]$ 22 respectively. The values of each colorant are integers encoded in S-bits, which means $0<=A_s[i,j], B_s[i,j], C_s[i,j]<2^S$.

FIGS. 2A, 2B and 2C are diagrams showing a prior art method for dithering a source image. The color image is to be dithered into a 3-colorant pixel array with colorant values encoded in T-bits, wherein T<=S. Prior to dithering the source image, the S-bits source colorant values $A_s[i,j]$, $B_s[i,j]$ and $C_s[i,j]$ are converted to higher bit-resolution encoded in U-bits, where U>=S, through three linearization look-up tables $L_a$ 24, $L_b$ 25 and $L_c$ 26 for one or more of the following purposes: linearization, gray balance, and preserving numerical precision. The converted U-bits colorant values are in a quantization space $(0, 2^U)$. The converted three colorant values in the quantization space are denoted by $A_q[i,j]$ 27, $B_q[i,j]$ 28 and $C_q[i,j]$ 29. As shown in FIGS. 2A, 2B and 2C, three quantization table $A_t[t_1]$ 30, $B_t[t_2]$ 31 and $C_t[t_3]$ 32 for each colorant A, B, C respectively are defined, where $0<=t_1, t_2, t_3<2^T$. The values of $A_t[t_1]$, $B_t[t_2]$, and $C_t[t_3]$ are U-bit numbers in the quantization space. This means $0<=A_t[t_1], B_t[t_2], C_t[t_3]<2^U$, and $A_t[t_1], B_t[t_2], C_t[t_3]$ are selected from the $2^U$ possible values and satisfying $A_t[0]=0, B_t[0]=0, C_t[0]=0; A_t[t_1]<A_t[t_1+1], B_t[t_2]<B_t[t_2+1], C_t[t_3]<C_t[t_3+1]$. It is desirable, but not required, to have a equally divided quantization space, that is for all the possible values of a and b, $(A_t[a+1]-A_t[a])=(A_t[b+1]-A_t[b])$, $(B_t[a+1]-B_t[a])=(B_t[b+1]-B_t[b])$ and $(C_t[a+1]-C_t[a])=(C_t[b+1]-C_t[b])$. The indices $t_1$ 36, $t_2$ 37 and $t_3$ 38 which are indices of the three quantization tables are also the output pixel value in the output color space.

FIG. 3 is a diagram showing a prior art schematic view of a 3-dimensional cubic quantization interval 40 containing the converted pixel value $(A_q[i,j], B_q[i,j], C_q[i,j])$ 41 in the quantization space 42. The entire quantization space are divided into smaller cubic subintervals by the three quantization tables $A_t[\ ]$, $B_t[\ ]$ and $C_t[\ ]$. As shown in FIG. 4, which is a diagram illustrating a prior art schematic view of a cubic quantization interval, having 8 corner points $P_{000}=A_t[t_1]B_t[t_2]C_t[t_3]$ 44, $P_{100}=A_t[t_1+1]B_t[t_2]C_t[t_3]$ 46, $P_{010}=A_t[t_1]B_t[t_2+1]C_t[t_3]$ 48, $P_{110}=A_t[t_1+1]B_t[t_2+1]C_t[t_3]$ 50, $P_{001}=A_t[t_1]B_t[t_2]C_t[t_3+1]$ 52, $P_{101}=A_t[t_1+1]B_t[t_2]C_t[t_3+1]$ 54, $P_{011}=A_t[t_1]B_t[t_2+1]C_t[t_3+1]$ 56, $P_{111}=A_t[t_1+1]B_t[t_2+1]C_t[t_3+1]$ 58.

A dither matrix, or threshold array is an two dimensional array of uniformly distributed random or pseudo-random numbers $H[i,j]$, where $0<=H<=H_{max}$. If the quantization space is equally divided, $H_{max}$ equals to $(A_t[t_1+1]-A_t[t_1])$, $(B_t[t_2+1]-B_t[t_2])$ and $(C_t[t_3+1]-C_t[t_3])$.

For each pixel in the color image, the goal of the dithering process is to select one out of the eight corner points $P_{000}, P_{100}, \ldots, P_{111}$ of the cubic quantization interval 40 containing the converted pixel value 41 in the quantization color space 42, by comparing a value from the threshold array against the relative offset of the pixel value in the quantization interval. The output pixel value of the dithering process is three quantization table indices $t_1$, $t_2$ and $t_3$ corresponding to the selected corner point.

The above-described conventional method of quantizing or dithering an image requires three independent dither matrices for each of the three colorants to process the source image. The result of this methodology tends to generate color with higher variation. It is, therefore, desirable to have a method that can efficiently dither an image with a single dither matrix yet still be able to retain the quality of such image.

SUMMARY OF THE INVENTION

An object of the invention is to dither a color image with smaller color variation with a single dither matrix.

Another object of the invention is to dither a color image with better control of dot placement of multiple colorants.

In a specific embodiment of the presentation, a device for dithering a color image is described. In one embodiment, the device includes a truncating logic for truncating a value of a pixel having a point in a color space of said source image, for locating a 3-dimensional cubic subinterval containing the point; a random number generator for generating a random number as a threshold value for dithering each pixel value of said source image; a first comparator for locating a tetrahedron having four vertices in said three-dimensional cubic subinterval that contains the pixel point; a second logic for assigning a probability density corresponding to each of the vertex; a second comparator for selecting a vertex provided by the threshold value through an inverse probability distribution function derived from the probability densities of the vertices; and a third logic for locating an output point in an output color space corresponding to the selected vertex.

In another embodiment, a device for dithering a source color image via weighting coefficient associated with a plurality of sample points in a source color space of the source color image is described. The device includes a first logic for generating the weighting coefficients of the sample points, wherein the weighting coefficients are probability densities of the sample points; a second logic for generating a random number as a threshold value for dithering a pixel value of the source image; a third logic selecting a point from the plurality of said sample points provided by the threshold value through an inverse probability distribution function derived from us the weighting coefficients of said points; and a fourth logic for locating an output point in an output color space corresponding to the selected point.

One advantage of the present invention is that it provides a mechanism that is capable of dithering a color image with smaller color variation or error.

Another advantage of the present invention is that it provides a mechanism that is capable of dithering a color image with better control of dot placement of multiple colorants.

These and other objects and advantages of the present invention will no doubt become apparent after reading the following detailed description of the preferred embodiments which are illustrated in the several figures of the drawing.

IN THE DRAWINGS

DETAILED DESCRIPTION OF THE PREFERRED EMBODIMENTS

The present invention discloses a system and method for generating a color image for outputting to an output device such as a video display, printer, facsimile machine, etc. The system according to the invention converts a source image into an image that has less pixel depth and yet preserves the visual image information of the original source image. The invention can be embodied either in a computer program that implements the procedure described later in this invention, or in dedicated digital electronic circuitry designed to perform the same function.

The present invention utilizes a statistical algorithm in converting pixel values in the source image into output values through quantizing RGB or CMY colorant by selecting an corner point of a region from a plurality of predefined regions in color space that is closest to the pixel to be the output of the pixel of the image.

Figure 1:
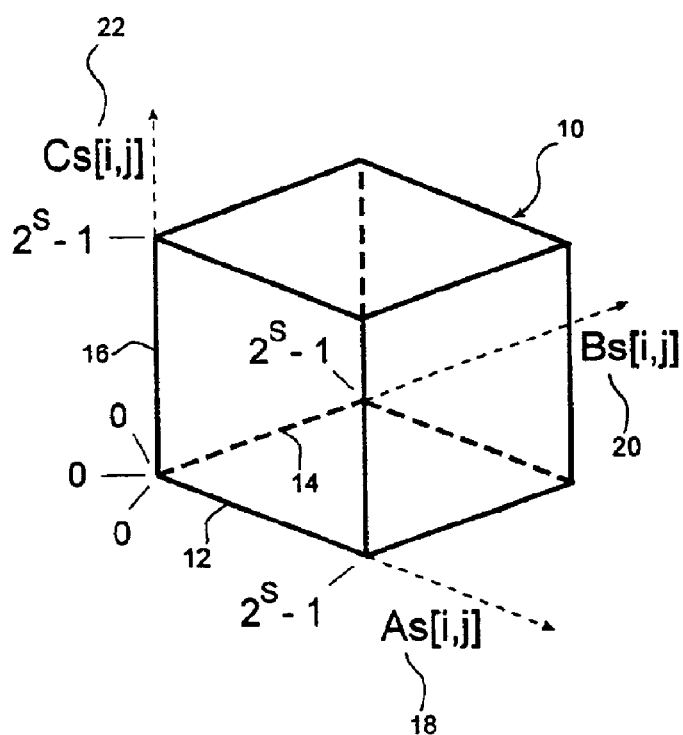
FIG. 1 is a diagram illustrating a prior art schematic of a color space of a source color image.
Figure 2A:
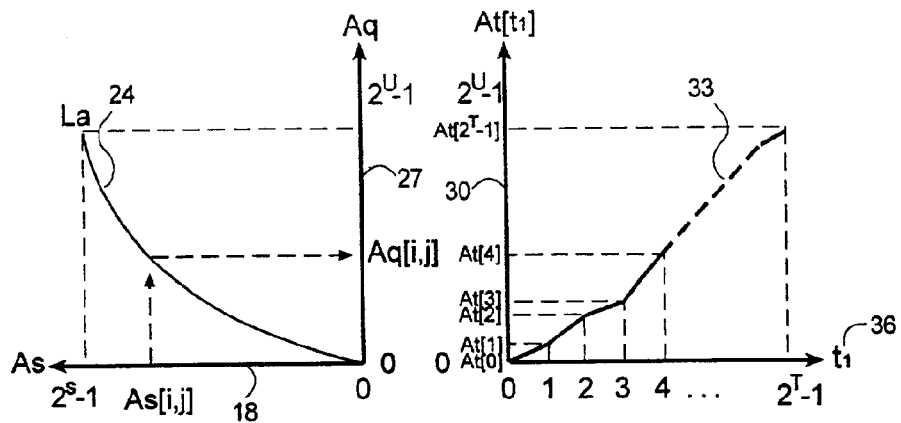
FIGS. 2A–2C are diagrams depicting a prior art method of dithering a source image.
Figure 2B:
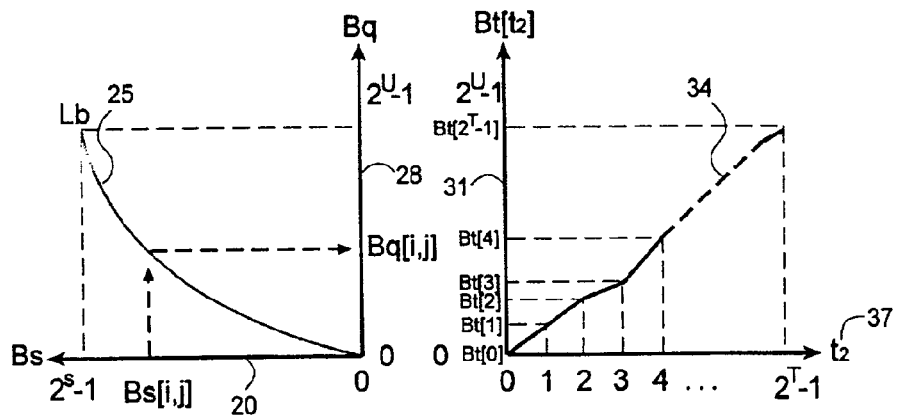
Figure 2C:
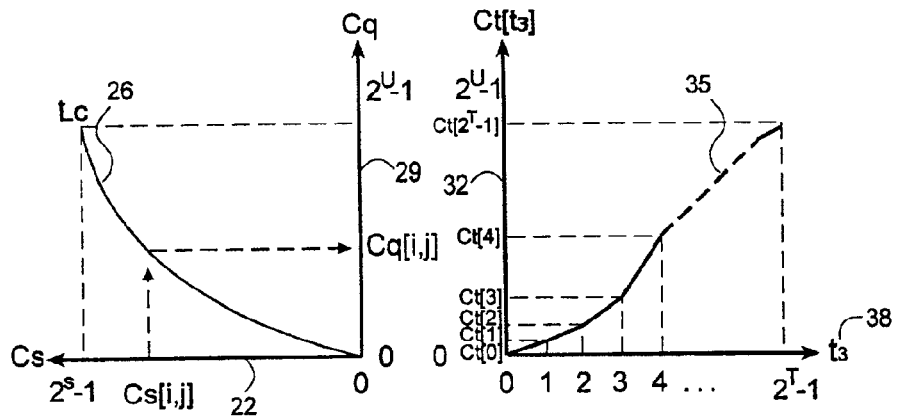
Figure 3:
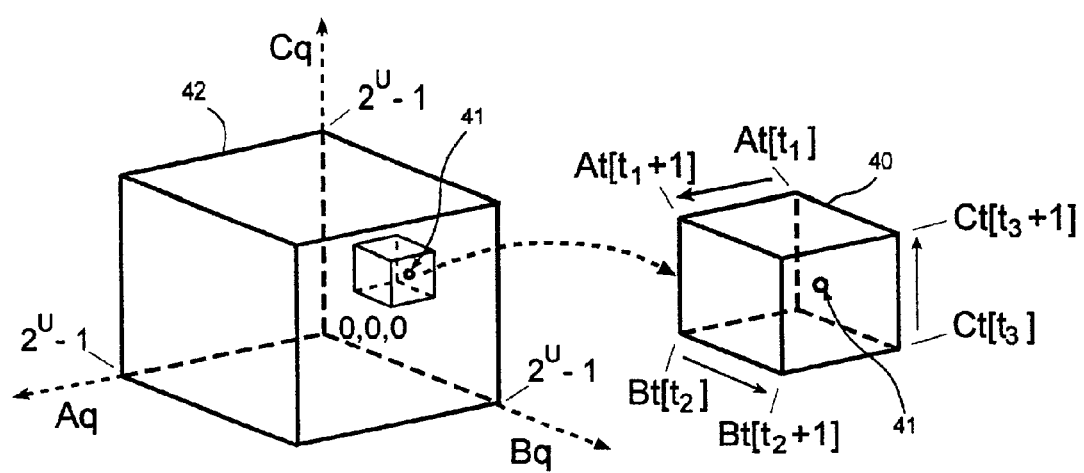
FIG. 3 is a diagram showing a prior art schematic view of a pixel point in a cubic subinterval of a quantization space.
Figure 4:
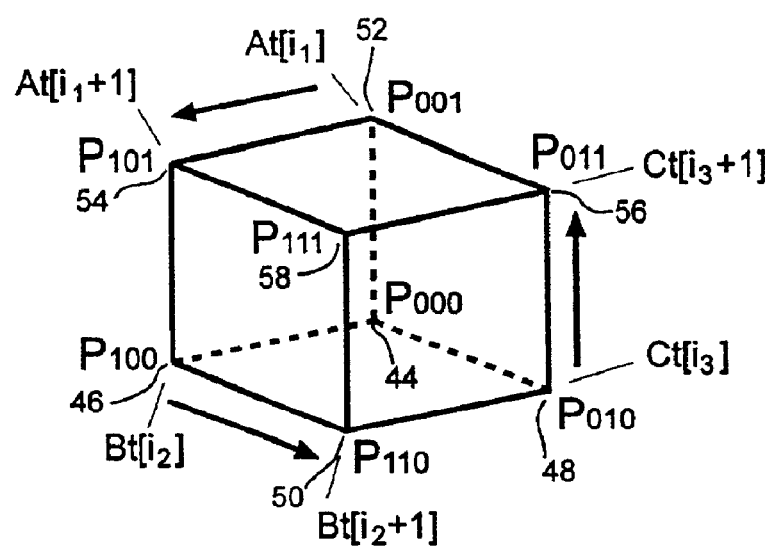
FIG. 4 is a diagram illustrating a prior art schematic view of a cube subinterval of a quantization space.
Figure 5:
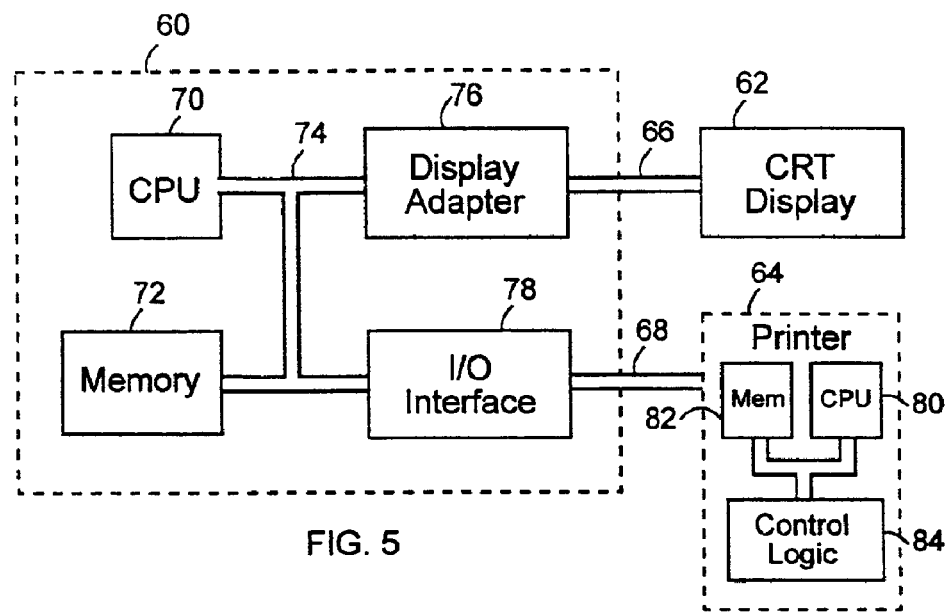
FIG. 5 is a block diagram illustrating an exemplary embodiment for the image processing method and apparatus of the present invention.

FIG. 5 is a block diagram illustrating an exemplary embodiment for the image processing method and apparatus of the present invention. A computer system 60 sends formatted image data stream to a multi-color display devices such as a CRT display 62 or color printer 64 via appropriate communications channels such as a video cable 66 and a printer cable 68 respectively. The printer cable 68 can be a parallel communications cable or a serial communications cable, or a USB communications cable. The computer system 60 comprises various devices for generating the formatted image stream such as a central processing unit (CPU) 70 and memory 72 coupled together through a bus 74 in the computer system 60. The computer system 60 further includes a display adapter 76 coupled to the bus 74 on one end and to the CRT display 62 via the video cable 66. The CPU 70 processes the source image and generates the output data to be displayed on the CRT display 62 or to be printed on the printer 64 in accordance with the algorithm to be discussed hereunder. The computer system 60 may further include an input/output interface (I/O interface) 78 for handling communications between the computer system 60 and the printer 64, or a facsimile machine (not shown).

In the embodiment described above, the printer 64 comprises a processor 80, a memory 82, and a control logic 84 to control the printer operation as well as the communications to and from the I/O interface 78. The processor 80 is coupled to the memory 82 and the control logic 84 and controls the operation of the control logic 84. The processor 80 may further process the source image it receives from the computer system 60 and operative to produce the output data to be printed on the printer 64 according to the algorithm to be discussed below.

Figure 6:
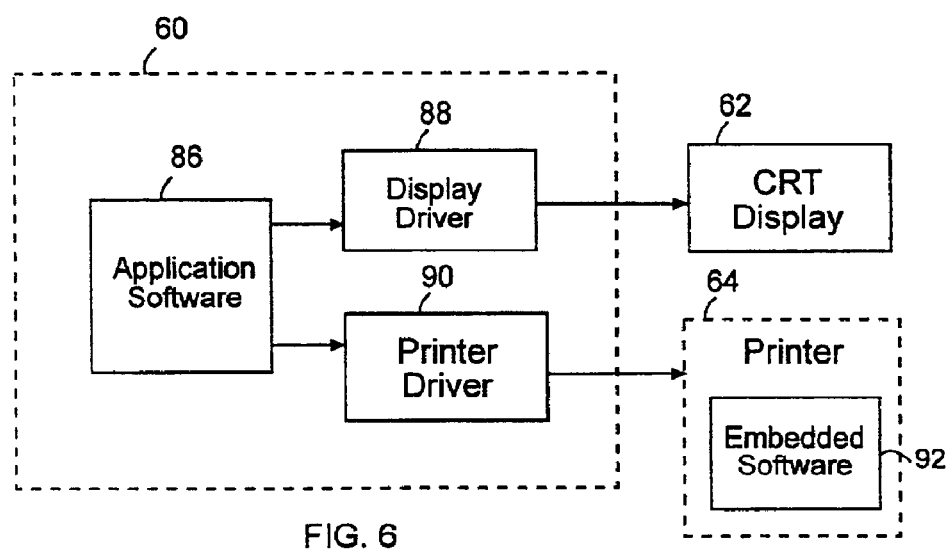
FIG. 6 is a block diagram illustrating the software operation and flow in the embodiment depicted in FIG. 5.

FIG. 6 is a block diagram illustrating the software operation and flow in the embodiment depicted in FIG. 5. The computer system 60 comprises an application software 86 that performs the operation in converting a source image to an output data to be displayed on a video display or printed on a printer. The application software sends the converted output data to a buffer where display driver 88 in the display adapter 76 can retrieve for outputting to the CRT display 62. Alternatively, the application software 86 may send the converted output data to a buffer where a printer driver 90 embedded in the I/O interface 78 may retrieve for printing to a printer 64. The printer 64 includes an embedded software 92 that controls the operation of the control logic 84 in the printer for printing the output data on the printer 64. In the preferred embodiment, either the CPU 70 in the computer system 60 or the processor 80 in the printer can employ the methodology described in the present invention to convert pixilated source image data to lower pixel depth suitable for the destination output device. As depicted in FIG. 6, in a typical implementation the instructions performing the invention's method are usually embedded in a program such as display driver 88 or printer driver 90, or as part of an embedded printer software 92.

For better performance concerns, the display adapter 76 or the printer control logic 84 can implement present invention's methodology in a digital logic circuitry which can perform the operation in much higher speed. In such implementation the CPU 70 of the computer system 60 sends the unconverted source image to the image displaying device for conversion.

As a background to the present invention, the method of linear interpolation will be described. A set of probability density functions described later in the invention is derived from the general linear interpolation function, which is:

$$(V) = \sum_i a_1 * (V_1)$$

$$\sum_i a_i = 1 \text{ and } 0 \le a_1 \le 1$$

where
"$V_i$'s" are the vertices that defines a subinterval area over which the interpolation is performed. Each $V_i$ has a corresponding output value ($V_i$).
"V" is the input point for which the interpolated output value (V) is derived. V is located in the subinterval area defined by $V_i$'s.
"$a_i$" is the weighting coefficient corresponding to the vertex $V_i$. $a_i$ is directly derived from the relative position of V with respect to the positions of the vertices $V_i$. $a_i$ meets the requirements that the closer V is located to a particular vertex $V_x$, the value of $a_x$ becomes larger. If V happens to be one of the vertex $V_x$, the value of $a_x$ is 1 and the values of all the other $a_i$ ($x \ne i$) are 0.

Figure 7A:
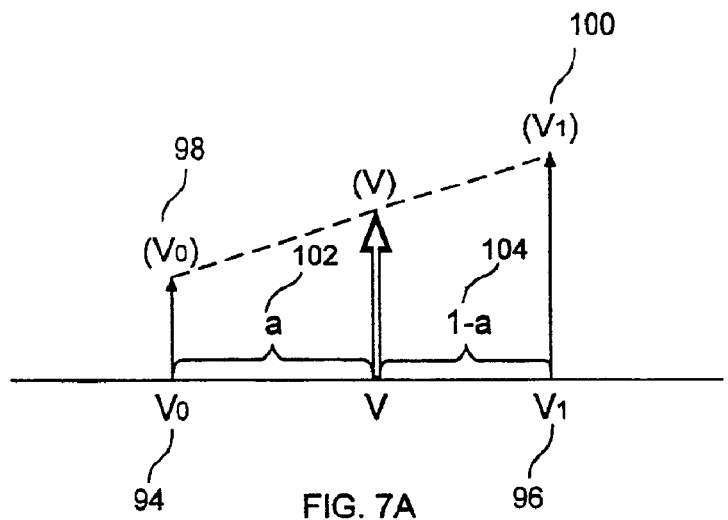
FIG. 7A is a diagram illustrating a method of one-dimensional interpolation using difference values.

Referring now to FIG. 7A, which is a diagram showing a one-dimensional interpolation method. In FIG. 7A, $V_0$ 94 and $V_1$ 96 denote two input values which defines a subinterval of a one-dimensional space. Each of these input values $V_0$ 94 and $V_1$ 96 maps to a corresponding output value ($V_0$) 98 and ($V_1$) 100 as shown. Assuming the distance between $V_0$ and $V_1$ is normalized to 1, the interpolation for any input value that falls between $V_0$ and $V_1$ can be expressed with a weighting coefficient "a" 102, 0<=a<=1, wherein "a" is the normalized distance between V and $V_0$. The normalized distance between V and $V_1$ is (1–a) 104. Based on the location of a input value V that falls between $V_0$ and $V_1$, an interpolated output value (V) corresponding to the input value V located in the subinterval between $V_0$ and $V_1$ is given as follows:

$$(V)=(1-a)*(V_0)+a*(V_1)$$

where a is the normalized distance from $V_0$ to V:

$$a=(V-V_0)/(V_1-V_0)$$

Figure 7B:
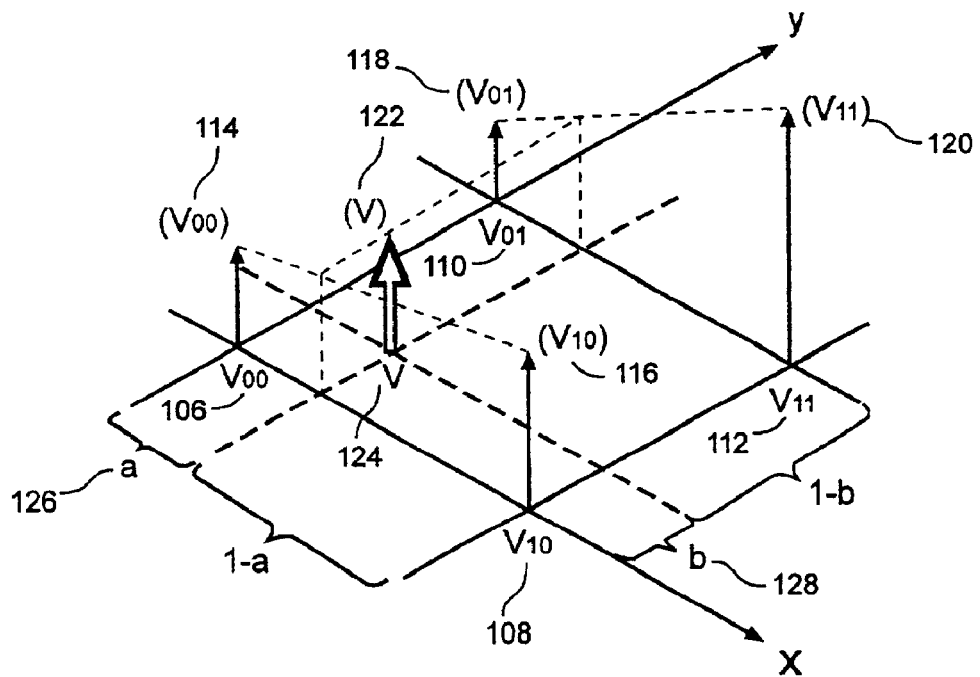
FIG. 7B is a diagram illustrating a method of a two-dimensional interpolation using difference values.

The basic interpolation form can be extended into multi-dimensional space. FIG. 7B is a diagram depicting a rectangular area subinterval in the 2-dimensional space. The input values at the four corners are labeled $V_{00}$ 106, $V_{10}$ 108, $V_{01}$ 110 and $V_{11}$ 112 with the corresponding output values are ($V_{00}$) 114, ($V_{10}$) 116, ($V_{01}$) 118 and ($V_{11}$) 120. The interpolated output value (V) 122 of any input value V 124 in the 2-dimensional subinterval defined by $V_{00}$, $V_{01}$, $V_{10}$, $V_{11}$ is given by using two weighting coefficients "a" 126 and "b" 128 as follows:

$$(V)=f(x,y)=(1-a)*(1-b)*(V_{00})+a*(1-b)*(V_{10})+(1-a)*b*(V_{01})+a*b*(V_{11})$$

where a 126 and b 128 are the normalized distance from $V_{00}$ to V:

$$a=(V_x-V_{00,x})/(V_{10,x}-V_{00,x})$$

$$b=(V_y-V_{00,y})/(V_{01,y}-V_{00,y})$$

where $V_x$ is the position of V in reference to the X-axis and $V_y$ is the position of V in reference to the Y-axis.

Figure 7C:
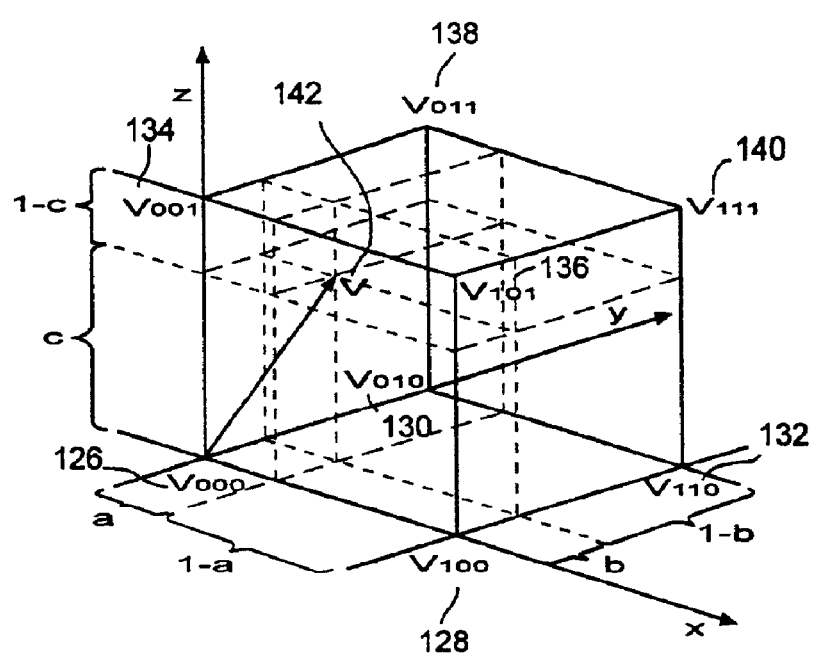
FIG. 7C is a diagram showing a three-dimensional interpolation unit.

Referring now to FIG. 7C, which is a diagram showing a three-dimensional subinterval over which interpolation is performed. Similar to the above description in 1-dimensional or 2-dimensional interpolation, in a 3-dimensional space, over the cubic subinterval defined by vertices $V_{000}$ 126, $V_{100}$ 128, $V_{010}$ 130, $V_{110}$ 132, $V_{001}$ 134, $V_{101}$ 136, $V_{011}$ 138, $V_{111}$ 140 the interpolated output value (V) (not shown) of an input value V 142 in the subinterval has the following form:

$$(V)=(1-a)*(1-b)$$

$$*(1-c)*(V_{000})+a$$

$$*(1-b)*(1-c)*(V_{100})$$

$$+(1-a)*b*(1-c)*(V_{010})$$

$$+a*b*(1-c)*(V_{110})$$

$$+(1-a)*(1-b)*c$$

$$*(V_{001})+a*(1-b)*c$$

$$*(V_{101})+(1-a)*b*c$$

$$*(V_{011})+a*b*c*(V_{111})$$

where a, b, c are normalized distance from $V_{000}$ to V:

$$a=(V_x-V_{000,x})/(V_{100,x}-V_{000,x})$$

$$b=(V_y-V_{000,y})/(V_{010,y}-V_{000,y})$$

$$c=(V_z-V_{000,z})/(V_{001,z}-V_{000,z})$$

where $V_x$ is the position of V in reference to the X-axis, $V_y$ is the position of V in reference to the Y-axis, and $V_z$ is the position of V in reference to the Z axis.

To reduce the numerical operation involved in interpolation process, it is common practice to use less sample points or vertices in the process, yet still obtains acceptable results. In the 2-dimensional space, a minimum of three sample points that define a triangular shape containing the interpolation point V are required to produce the interpolated output. In the 3-dimensional space, a minimum of four sample points that define a tetrahedron volume containing the interpolation point V are required to produce the 3-dimensional interpolated output.

Figure 8A:
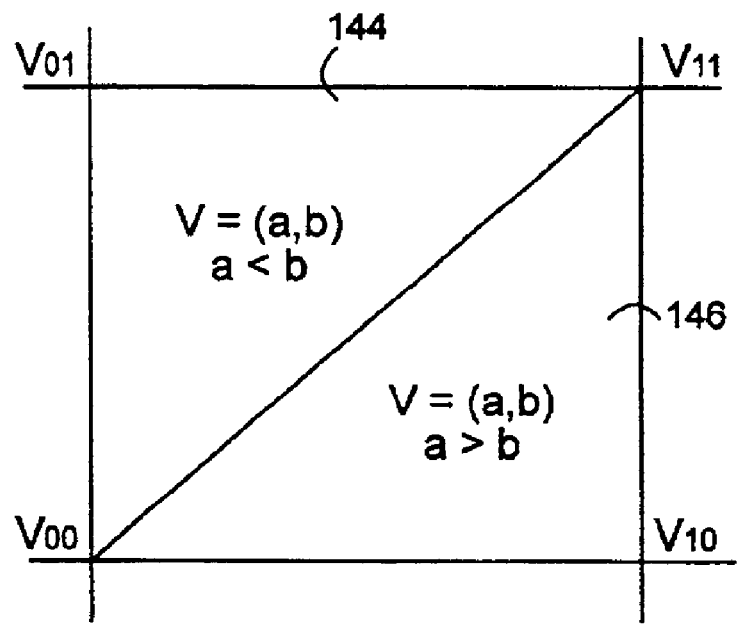
FIGS. 8A and 8B are diagrams showing two forms used in triangular interpolation in a 2-dimensional color space.
Figure 8B:
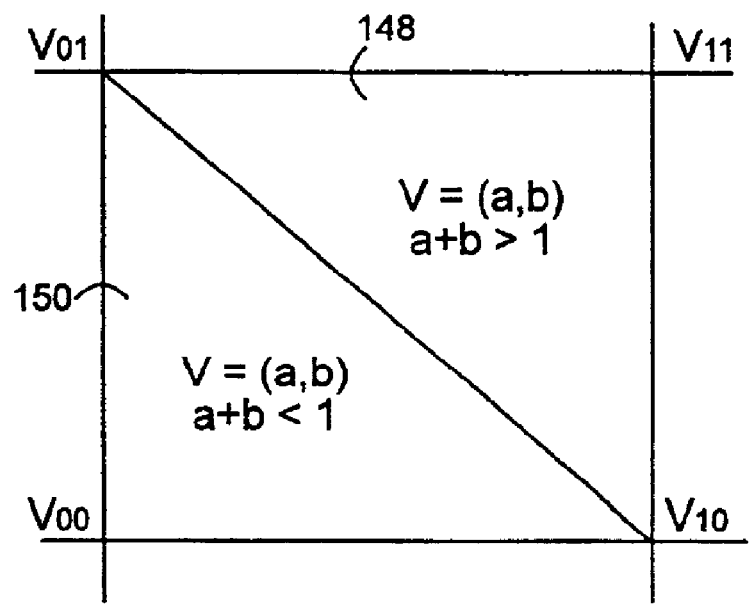
Figure 9A:
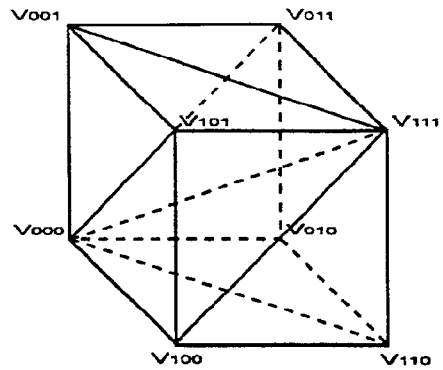
FIGS. 9A–9C are diagrams each illustrating a different way of dissecting a 3-dimensional cubic subinterval into tetrahedrons and showing weighting coefficients associated with the vertices.
Figure 9B:
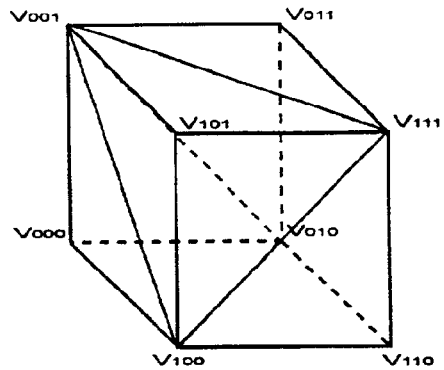
Figure 9C:
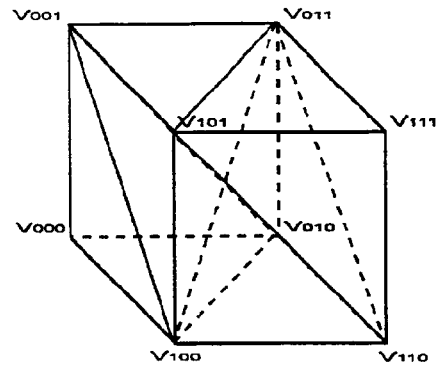
Figure 9D:
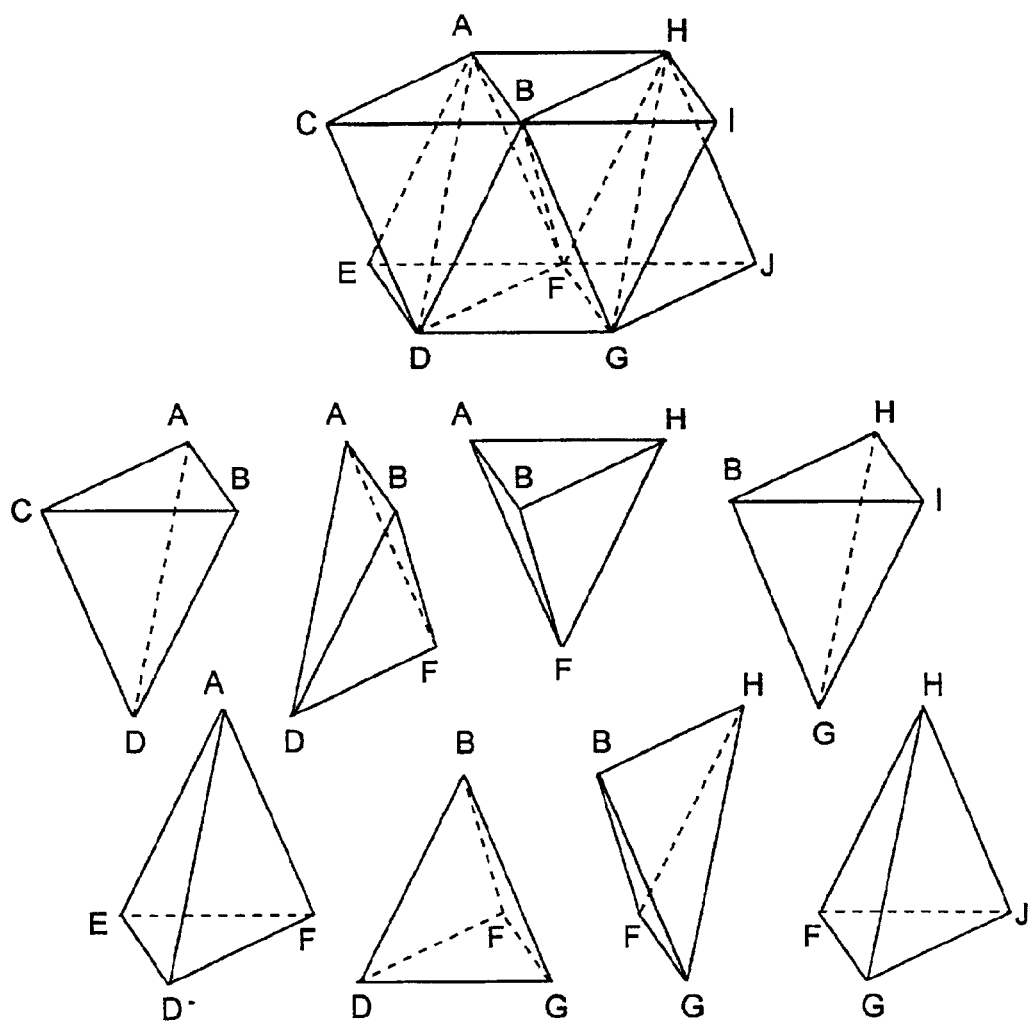
FIG. 9D is a diagram illustrating a lattice structure of tetrahedrons.

In a 2-dimensional space as illustrated above, there are two forms of triangular interpolation for computing the interpolated output. One is shown in FIG. 8A, the interpolated output value (V) is given by arranging weighting coefficient for the upper triangle 144 and lower triangle 146 as following:

$(V)=(1-a)*(V_{00})+(a-b)*(V_{10})+b*(V_{11})$ if $a \geq b$; or $(V)=(1-b)*(V_{00})+(b-a)*(V_{01})+a*(V_{11})$ if $a<b$ Referring to FIG. 8B, in the alternative interpolation form the 2-dimensional rectangle subinterval is dissected into upper triangle 148 and lower triangle 150 by drawing a line through vertices $V_{10}$ and $V_{01}$. The interpolated output is given as following:

$(V)=(1-a-b)*(V_{00})+a*(V_{10})+b*(V_{01})$ if $(a+b)<1$; or $(V)=(1-b)*(V_{10})+(1-a)*(V_{01})+(a+b-1)*(V_{11})$ if $(a+b) \geq 1$ The tetrahedral interpolation forms use 4 corner vertices out of the 8 vertices of a cubic subinterval in the 3-dimensional space. There are many 3-dimensional tetrahedral interpolation forms. FIGS. 9A, 9B, and 9C are diagrams each illustrating one of 3 different ways of dissecting a 3-dimensional cubic subinterval into tetrahedrons. A list of the weighting coefficient of the vertex subsets of each tetrahedron is also given for each interpolation form. FIG. 9D is a diagram illustrating a lattice structure of tetrahedrons which gives a more uniform tetrahedrons but requires more complicated interpolation coefficient calculations.

The manner in which the four weighting coefficient $a_i$ of a tetrahedron is derived is as follows.

Figure 10:
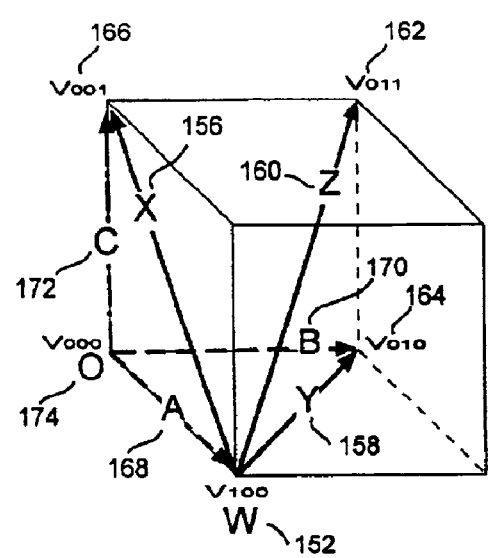
FIG. 10 is a diagram illustrating a method of deriving weighting coefficients of a tetrahedron of the preferred embodiment of the present invention.

FIG. 10 is a diagram illustrating a method of deriving weighting coefficients of a tetrahedron of the preferred embodiment of the present invention. The coefficient is the probability for the output data to fall within the tetrahedron within a dissected unit cube. Referring now to the example illustrated in FIG. 10, first select one of the four vertex as the new origin point W 152 identified as $V_{100}$ 154, and three axis X 156, Y 158, Z 160 pointing to the other three vertices identified as $V_{011}$ 162, $V_{010}$ 164, and $V_{001}$ 166 respectively. Next, write down the vector representation of W, X, Y, Z in terms of the base vectors A 168, B 170, C 172 and the origin O 174. Follow by representing O, A, B, C in terms of W, X, Y, Z. The last step is to convert the representation of an input interpolation point from the O, A, B, C space into the new W, X, Y and Z space. The coefficients of X, Y, Z in the new representation are the weighting coefficient of vertices X, Y, Z respectively. The weighting coefficient of W is given by subtracting the weighting coefficients of X, Y, Z from 1.

In the examples of FIG. 10, W, X, Y, Z are written as:

$W=O+A$ $X=C-A$ $Y=B-A$ $Z=B+C-A$

Then solving for O, A, B, C:

$O=W-A$ $A=Z-X-Y$ $B=Z-X$ $C=Z-Y$

Substitute O, A, B, C into the vector representation of an interpolation point:

$O+a*A+b*B+c*C=(W-A)+a*A+b*B+c*C=W+(a-1)*A+b*B+c*C=W+(a-1)*(Z-X-Y)+b*(Z-X)+c*(Z-Y)=W+(a+b+c-1)*Z+(1-a-b)*X+(1-a-c)*Y$

The resulting weighting coefficients of vertices X, Y, Z are (1−a−b), (1−a−c) and (a+b+c−1) respectively. The weighting coefficient of W is 1−(1−a−b)−(1−a−c)−(a+b+c−1)=a.

It is the basic feature of the present invention that the 2-dimensional triangular or 3-dimensional tetrahedral interpolation coefficients described above are used as probability density values for dithering over the tetrahedron within which the input point is located.

Figure 11:
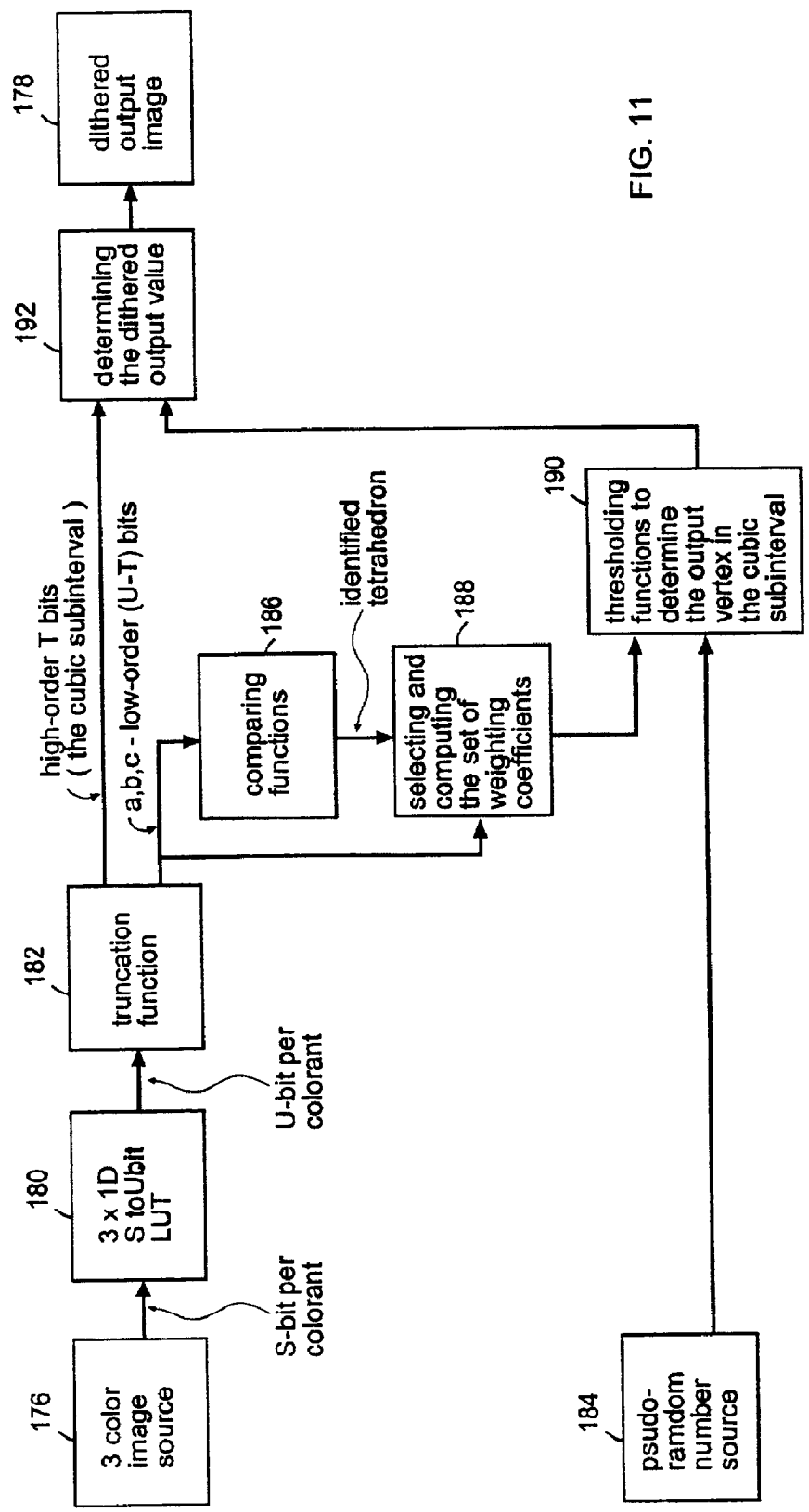
FIG. 11 is a block diagram illustrating an exemplary dithering process of the present invention.

FIG. 11 is a block diagram illustrating an exemplary dithering process of the present invention. Input color pixels are encoded as 3-colorant values. Each colorant is encoded in an S-bit binary number, wherein the S-bit is the original precision of the colorant value. The input color image is to be converted into an output image of lower bit depth T for each colorant. The colorants are named A, B and C where in a particular application A, B, C can refer to R, G, B display color or C, M, Y printer color, or any device independent color such as L, a, b color. An image source provides a 3-colorant source image 176 to be converted into a dithered output image 178. The image source can be a scanner, digital camera, or image data stored in computer memory. Three 1-dimensional look-up tables 180 each converts its respective S-bit input colorant value to a higher bit depth U, where $U \geq S$. This process avoids the loss of precision before the quantization occurred in conventional color calibration processes. In conventional color calibration processes, an 8-bit to 8-bit look-up table can map two input color values onto the same output value and, thus, causes lost of precision as a consequence. These look-up tables are optional, but preferred in a typical implementation of the present invention for one or more of the following practical reasons:

1. normalizing the quantization intervals;
2. linearizing or calibrating output device;
3. maintaining gray balance from the input to the output image; or
4. preserving numerical precision during subsequent computation.

The first reason identified above eliminates the need to build 3 quantization tables of non-uniform quantization intervals. These tables of non-uniform quantization interval are used to locate the 3-dimensional cubic subinterval that contains the input pixel value. With normalized quantization intervals the cubic subinterval can simply be located by truncating off the lower bits of the U-bit colorant values and use the higher bits as the indices to the cubic subinterval.

Figure 12:
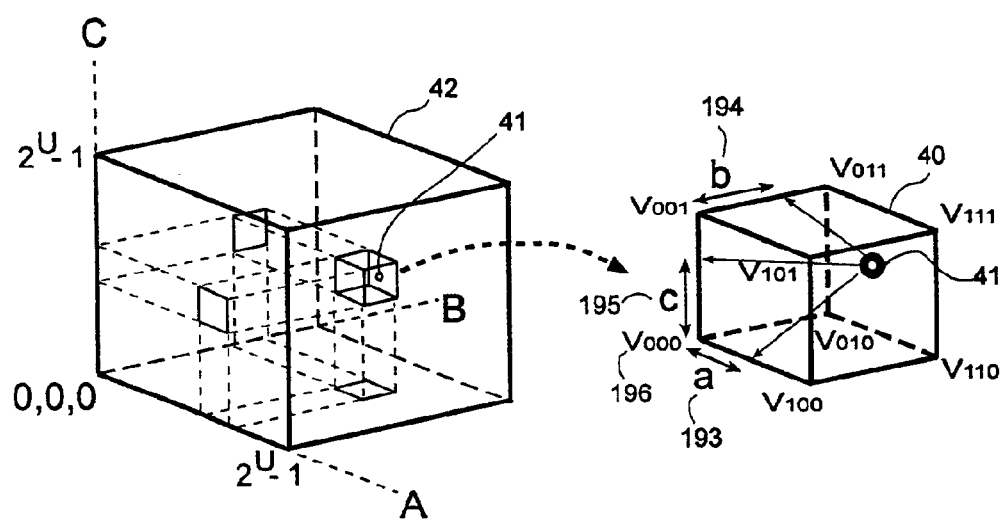
FIG. 12 is a diagram showing schematic view of a pixel value in a cubic subinterval in a color space of the present invention.

Still referring to FIG. 11, the truncation functions 182 separates the upper T-bits of the U-bits color values and the remaining lower order (U-T) bits. The upper T-bits of the 3 colorants identify the cubic subinterval that contains the input point to be described in conjunction with FIG. 12. As illustrated in FIG. 7C and FIG. 12, the value of each pixel corresponds to a point 41 in the 3-dimensional color space 42. The vertices of the cubic subinterval containing the pixel point are named $V_{000}$, $V_{100}$, $V_{010}$, $V_{110}$, $V_{001}$, $V_{101}$, $V_{010}$, $V_{111}$, The three lower-order (U-T) bit values are named a, b, c for each colorant A, B, and C respectively. As illustrated in FIG. 7C in conjunction with FIG. 12, a 193, b 194 and c 195 are the relative position of the pixel point 41 in the cubic subinterval 40 in the color space 42 with respect to the origin of the lower corner $V_{000}$ 196 of the cubic subinterval. The lower-order (U-T) bits of a U-bit colorant value represent the relative position of the pixel value within the cubic subinterval identified by the upper T-bit value. Since the value of a, b, c are (U-T) bits, the unity value 1 representing the size of the cubic subinterval is scaled up by $2^{(U-T)}$ times and denoted by 1N for the subsequent integer computation.

Referring to FIG. 11, A pseudo-random number source 184 provides a uniformly distributed threshold value H, where $0 \leq H < 2^{(U-T)}$. The pseudo-random number source is usually implemented as a dither matrix, or threshold array, which is tiled and overlaying on top of the source image. The values of the dither matrix are periodically fetched from the matrix when each pixel of the source image is fetched and processed. In the case of bi-level output image values (T=1), the types of dither matrix are classified in two categories for practical reasons. The clustered-dot dither matrices tend to have high element values clustered together. The dispersed-dot dither matrices tend to have high-valued matrix elements mixed with low-valued ones. Dispersed-dot dither matrices in general produce better output quality over the clustered-dot dither matrices, which perform better when the output device has a very nonlinear response with respect to the input pixel values.

A set of comparing functions 186 identifies the tetrahedron in the identified cubic subinterval further contains the input point. The actual comparing functions vary in accordance to the chosen tetrahedral interpolation form. Given the tetrahedral interpolation form illustrated in FIG. 9C, as an example, the following numeric comparisons are performed:

TABLE 1

Comparing functions to determine a tetrahedron for FIG. 9C.

| Comparisons performed | Tetrahedron/verticles identified |
|---|---|
| (a + b + c) < 1N | $T_1/V_{100}, V_{010}, V_{001}, V_{000}$ |
| (a + b + c) ≥ 1N, (a + b) < 1N, (a + c) < 1N | $T_2/V_{100}, V_{010}, V_{001}, V_{011}$ |
| (a + c) ≥ 1N, (a + b) <1N | $T_3/V_{100}, V_{101}, V_{001}, V_{011}$ |
| (a + b) ≥ 1N, (a + c) <1N | $T_4/V_{100}, V_{010}, V_{110}, V_{011}$ |
| (a + b + c) < (2*1N), (a + ) ≥ 1N, (a + c) ≥ 1N | $T_5/V_{100}, V_{101}, V_{110}, V_{011}$ |
| (a + b + c) ≥ (2*1N) | $T_6/V_{111}, V_{101}, V_{110}, V_{011}$ |

The tetrahedron identified by the comparing functions further determines the set of weighting coefficients used in the dithering. Referring to FIG. 11, a weighting coefficient table 188 is constructed by rearranging the weighting coefficients of the chosen interpolation form. Using the same interpolation form as illustrated in FIG. 9C, the weighting coefficient is arranged in table 2 as following:

TABLE 2

Listing of the vertices of each tetrahedron and the corresponding weighting coefficients as shown in FIG. 9C.

| Tetrahedron | $V_1/P_1$ | | $V_2/P_2$ | | $V_3/P_3$ | | $V_4/P_4$ | |
|---|---|---|---|---|---|---|---|---|
| $T_1$ | $V_{100}$ | a | $V_{010}$ | b | $V_{001}$ | c | $V_{000}$ | 1 − a − b − c |
| $T_2$ | $V_{100}$ | a | $V_{010}$ | 1 − a − c | $V_{001}$ | 1 − a − b | $V_{011}$ | a + b + c − 1 |
| $T_3$ | $V_{100}$ | 1 − c | $V_{101}$ | a + c − 1 | $V_{001}$ | 1 − a − b | $V_{011}$ | b |
| $T_4$ | $V_{100}$ | 1 − b | $V_{010}$ | 1 − a − c | $V_{110}$ | a + b− 1 | $V_{011}$ | c |
| $T_5$ | $V_{100}$ | 2 − a − b − c | $V_{101}$ | a + c − 1 | $V_{110}$ | a + b − 1 | $V_{011}$ | 1 − a |
| $T_6$ | $V_{111}$ | a + b + c − 2 | $V_{101}$ | 1 − b | $V_{110}$ | 1 − c | $V_{011}$ | 1 − a |

For each row of Table 2, the actual ordering of the vertices and weighting coefficients bears no mathematical difference. However, care must be taken, especially in the clustered-dot dither matrix situation, when arranging the weighting coefficients across any two adjacent tetrahedrons that share two or three common vertices. Drastic dot pattern change can be avoided when smoothly shaded pixel values in the source image transition from one tetrahedron into a neighboring one.

Figure 13A:
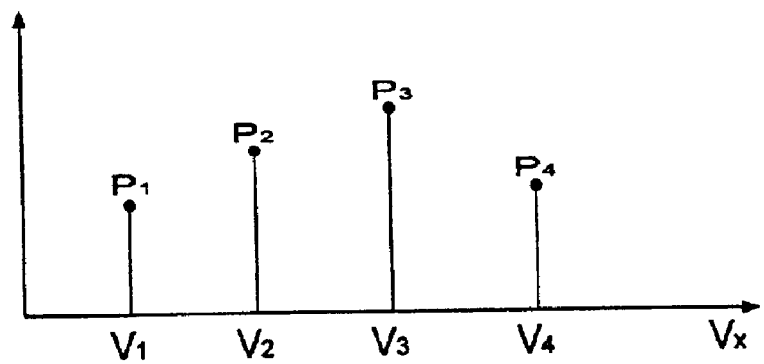
FIGS. 13A and 13B are diagrams illustrating the probability density function and associated probability distribution function used in the present invention.
Figure 13B:
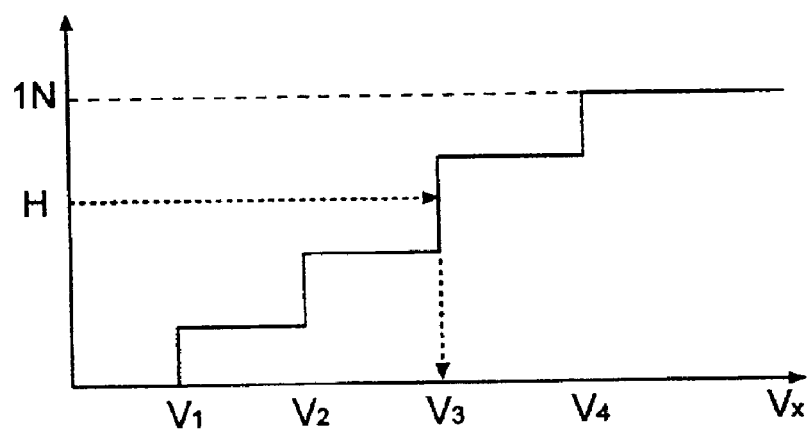

Referring now back to FIG. 11, the thresholding functions 190 comprises a second set of comparators that compare the threshold value H against the weighting coefficients from the weighing coefficient Table 2 in association with the selecting and computing the weighting coefficient 188. Referring to the probability distribution function depicted in FIG. 13A, the weighting coefficients are probability densities of the corresponding vertices $V_1$, $V_2$, $V_3$ and $V_4$ as shown in FIG. 13B. The output random variable $V_x$ takes the value of $V_1$, $V_2$, $V_3$ or $V_4$ and is statistically determined by the uniformly distributed random variable H through the inverse function of the probability distribution function. With the weighting coefficient described in Table 2, the comparisons with the thresholding functions proceed as follows:

First compare H with the first weighting coefficient $P_1$ of the chosen tetrahedron (or row) from Table 2. If H is smaller than or equal to the weighting coefficient $P_1$, stop here, the vertex $V_1$ of the chosen tetrahedron corresponding to the weighting coefficient $P_1$ is chosen as the output. If H is greater than $P_1$, subtract $P_1$ from H, compare the remaining H against the second weighting coefficient $P_2$ in the row, if H smaller than or equal to $P_2$, stop here and output vertex $V_2$ of the chosen tetrahedron, otherwise subtract $P_2$ from H and compare the remaining H with the third weighting coefficient $P_3$ of the chosen row. Again if H is smaller than or equal to $P_3$, output vertex $V_3$ of the chosen tetrahedron and stop, otherwise $V_4$ of the chosen tetrahedron is selected.

When implemented with an electronic circuitry, the comparisons of the thresholding functions can be performed in parallel by executing the following compares simultaneously:

$$H \leq P_1$$

$$H \leq P_1 + P_2$$

$$H \leq P_1 + P_2 + P_3$$

The resulting vertex within the 3-dimensional cubic subinterval containing the vertex is the dithered output from the dithering procedure. Referring to FIG. 11, the last output stage 192 combines the identified cubic subinterval from the truncation function and the selected vertex from the thresholding functions, and gives three T-bits binary values for each of the three colorant A, B, C respectively as the dithering output values to the output destination 178.

From the probabilistic point of view, various interpolation forms makes no difference in terms of giving the same average output colorant values. However the form does have an impact to the distribution of colorants with respect to each other. Experiments show that the interpolation form given by FIG. 9A tends to overlay colorants on top of each other, and the interpolation form in FIG. 9B and FIG. 9C tends to scatter the colorants. The selection of interpolation forms may have a significant effect to the visual quality of the output image.

Figure 14:
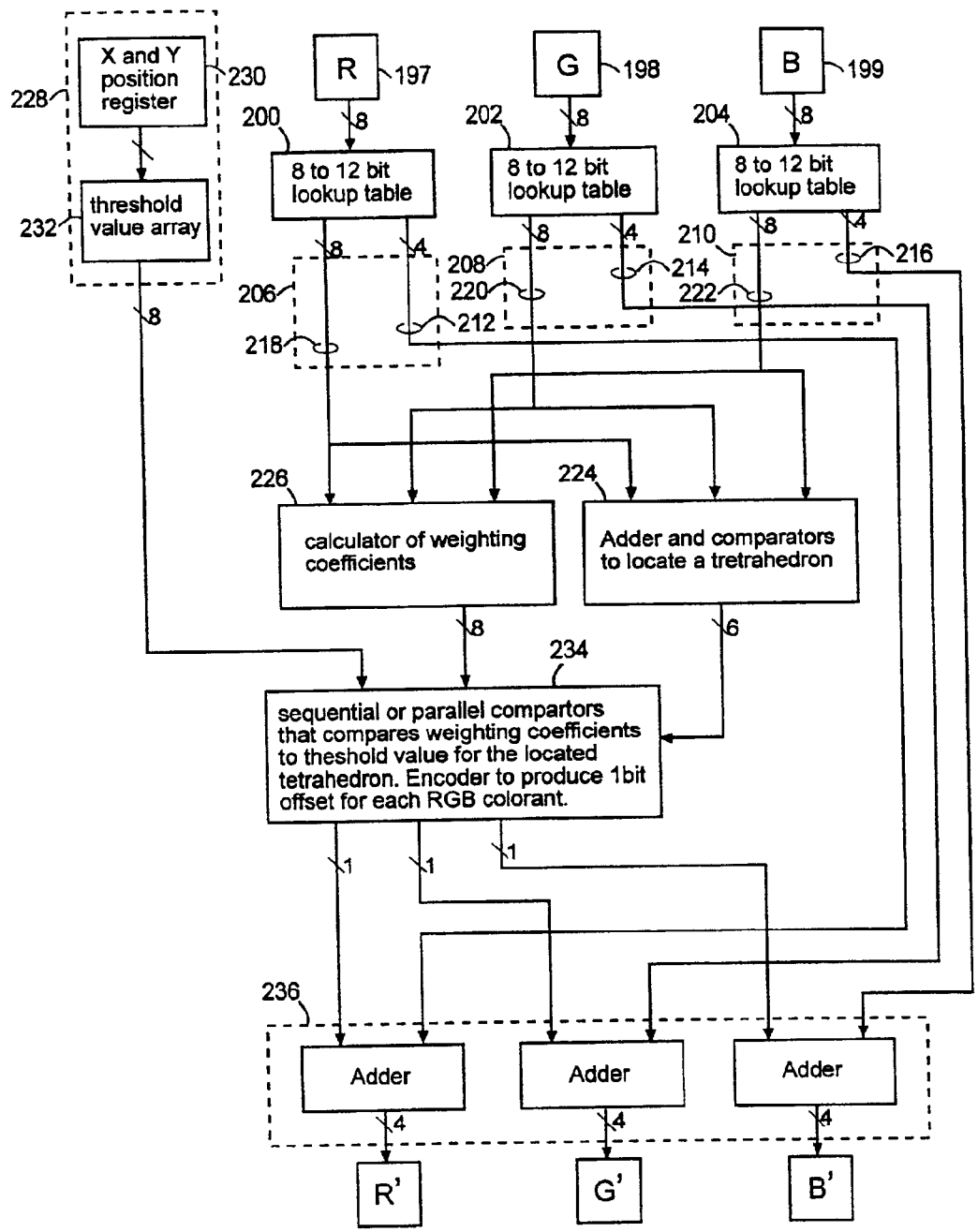
FIG. 14 is a block diagram showing an exemplary embodiment of the structure for the present invention.

FIG. 14 is a block diagram showing an exemplary embodiment of the structure for the present invention. Three colorants of a source image are provided and they are identified as R 197, G 198, and B 199 respectively in this example. The RGB described here correspond to the three color image source 176 referred to in FIG. 11 above. Each of the source colorant values is fed to its respective 8-bit to 12-bit look-up table 200, 202, and 204. The three look-up tables described here correspond to the look-up table 180 described above in FIG. 11. The results obtained from each look-up table is fed into a truncation function 206, 208, 210 for each colorant R, G, B respectively, wherein the upper bits 212, 214, 216 are separated and the lower-order bits 218, 220, 222 are fed into a comparator 224 to locate a tetrahedron having four vertices in a three-dimensional cubic subinterval that contains the pixel point, and to a calculator 226 for calculating of weighting coefficients and assigning a probability density corresponding to each of the vertices. The comparator 224 and calculator 226 described here correspond to the comparing functions 186 and computing function 188 described above in FIG. 11 respectively. A random number generator 228 having an X and Y position register 230 and a threshold value array 232 is provided for generating a random number as a threshold value for dithering each pixel value of the source image. The random number generator 228 corresponds to the random number source 184 in FIG. 11. The threshold value obtained from the random number generator 228 and the output produced by the comparator 224 and the calculator 226 are fed to a comparator unit 234 that compares the weighting coefficients to the threshold value for the located tetrahedron and is operative to select a vertex provided by the threshold value through an inverse probability function derived from the probability densities of the vertices. Finally, the selected vertex is provided to a logic 236 and combined with the upper bits 212, 214, 216 for locating an output point in an output color space corresponding to the selected vertex and thus determining the dithered output value of the source image. The comparator unit 234 and logic 236 described here correspond to the thresholding functions 190 and determining logic 192 described above in FIG. 11 respectively.

While the invention has been particularly shown and described with reference to the preferred embodiments, it will be understood by those skilled in the art that many other modifications and variations may be made thereto without departing from the broader spirit and scope of the invention as set forth in the claims. The specification and drawings are accordingly to be regarded as illustrative, rather than in a restrictive sense.

What is claimed is:

1. A device for dithering a three-color source image, comprising:
   a first logic for dissecting a color space of said source image into a plurality of tetrahedrons each having four vertices;
   a second logic for locating one of said tetrahedrons that contains a point corresponding to a value of a pixel of said source image;
   a third logic for generating a random number as a threshold value for dithering said pixel of said source image;
   a fourth logic for assigning a probability density corresponding to each of said vertex of said located tetrahedron;
   a fifth logic selecting a vertex as an interim output provided by said threshold value through an inverse probability distribution function derived from said probability densities of said vertices; and
   a sixth logic for locating an output point in an output color space corresponding to said selected vertex.

2. A device for dithering a source image according to claim 1, wherein said first logic that dissects said color space farther comprises:
   a first logic for truncating said value of said image pixel of said source image, for locating a 3-dimensional cubic subinterval containing said point; and
   a second logic for further dissecting said 3-dimensional cubic subinterval into a plurality of tetrahedrons.

3. A device for dithering a source image according to claim 1, wherein said logic for generating a random number is a 2-dimensional array of pseudo-random numbers overlaying on top of said source image.

4. A device for dithering a source image as recited in claim 1, further comprising a seventh logic containing one-dimensional look-up tables for converting an 3-component input colorant value into said pixel value.

5. A device for dithering a source image as recited in claim 1, wherein the device is embedded in a central processing unit in a computer system.

6. A device for dithering a source image as recited in claim 1, wherein said device is embedded in a processor in an output device.

7. A device for dithering a source image as recited in claim 6, wherein said output device is a printer.

8. A device for dithering a source image as recited in claim 6, wherein said output device is a display monitor.

9. A method for dithering a three-color source image, comprising the steps of:
   dissecting a color space of said color image into a plurality of tetrahedrons each having four vertices;
   locating one of said tetrahedrons that contains a point corresponding to a value of a pixel of said source image;
   generating a random number as a threshold value for dithering the said pixel value of said source image;
   assigning a probability density corresponding to each of said vertex of said located tetrahedron;
   selecting a vertex as an interim output provided by said threshold value through an inverse probability distribution function derived from said probability densities of said vertices; and
   locating an output point in an output color space corresponding to said selected vertex.

10. A method for dithering a source image according to claim 9, wherein said method that dissects said color space comprises the further steps of:
    truncating said value of said image pixel of said source image, for locating a 3-dimensional cubic subinterval containing said point; and
    further dissecting said 3-dimensional cubic subinterval into a plurality of tetrahedrons.

11. A method for dithering a source image as recited in claim 9, further comprising the steps of:
    converting an input colorant value into said pixel value through one-dimensional lookup tables, prior to said step of locating a tetrahedron.

12. A method for dithering a source image according to claim 9, wherein the step of generating a random number includes the step of fetching a pseudo-random number from a 2-dimensional threshold array overlaying on top of said source image.

13. A device for dithering a source color image via weighting coefficients associated with a plurality of sample points in a source color space of said source color image, comprising:

a first logic for generating said weighting coefficients of said sample points, wherein said weighting coefficients are probability densities of said sample points;

a second logic for generating a random number as a threshold value for dithering a pixel value of said source image;

a third logic selecting a point from said plurality of said sample points provided by said threshold value through an inverse probability distribution function derived from said weighting coefficients of said points; and a fourth logic for locating an output point in an output color space corresponding to said selected point.

14. A device for dithering a source image according to claim 13, wherein said logic for generating a random number is a 2-dimensional threshold array overlaying on top of said source image.

15. A device for dithering a source image as recited in claim 13, further comprising a fifth logic containing look-up tables for converting an input colorant value into said pixel value.

16. A device for dithering a source image as recited in claim 13, wherein the device is embedded in a central processing unit in a computer system.

17. A device for dithering a source image as recited in claim 13, wherein said device is embedded in a processor in an output device.

18. A device for dithering a source image as recited in claim 17, wherein said output device is a printer.

19. A device for dithering a source image as recited in claim 17, wherein said output device is a display monitor.

20. A method for dithering a source color image via weighting coefficients associated with a plurality of sample points in a source color space of said source color image, comprising the steps of:

generating said weighting coefficients of said sample points, wherein said weighting coefficients are probability densities of said sample points;

generating a random number as a threshold value for dithering a pixel value of said source image;

selecting a point from said plurality of said sample points provided by said threshold value through an inverse probability distribution function derived from said weighting coefficients of said points; and locating an output point in an output color space corresponding to said selected point.

21. A method for dithering a source image according to claim 20, wherein the step of generating a random number includes the step of fetching a pseudo-random number from a 2-dimensional threshold array overlaying on top of said source image.

* * * * *